(12) United States Patent
Jozwiak et al.

(10) Patent No.: US 8,926,344 B2
(45) Date of Patent: Jan. 6, 2015

(54) ELECTRICAL DISTRIBUTION CENTER ASSEMBLY HAVING A TERMINAL STABILIZER PLATE

(71) Applicant: Delphi Technologies, Inc., Troy, MI (US)

(72) Inventors: Andrew Joseph Jozwiak, El Paso, TX (US); Grant Michael Wheeler, El Paso, TX (US); Jesus R. Morales, Chihuahua (MX); Brian Skolnik, Trenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 38 days.

(21) Appl. No.: 13/742,660

(22) Filed: Jan. 16, 2013

(65) Prior Publication Data

US 2014/0199891 A1    Jul. 17, 2014

(51) Int. Cl.
*H01R 13/44*     (2006.01)
*H01R 24/66*     (2011.01)

(52) U.S. Cl.
CPC .................................... *H01R 24/66* (2013.01)
USPC ....................................................... 439/140

(58) Field of Classification Search
USPC ................................................. 439/140, 141
See application file for complete search history.

(56) References Cited

U.S. PATENT DOCUMENTS

| | | | |
|---|---|---|---|
| 5,437,558 A * | 8/1995 | Sakuraoka et al. | 439/140 |
| 5,715,135 A | 2/1998 | Brussalis et al. | |
| 5,788,529 A | 8/1998 | Borzi et al. | |
| 6,000,952 A | 12/1999 | Gladd et al. | |
| 6,077,102 A | 6/2000 | Borzi et al. | |
| 6,176,712 B1 * | 1/2001 | Huang | 439/140 |
| 6,220,876 B1 | 4/2001 | Avila et al. | |
| 6,390,834 B1 * | 5/2002 | Hofmeister et al. | 439/140 |
| 6,422,881 B1 | 7/2002 | Puhl et al. | |
| 6,739,889 B1 | 5/2004 | Daggett et al. | |
| 6,976,858 B1 * | 12/2005 | Kikuchi et al. | 439/140 |
| 7,635,212 B2 | 12/2009 | Seidler | |
| 7,927,111 B2 | 4/2011 | Kita | |
| 7,972,180 B2 | 7/2011 | Li et al. | |
| 8,267,702 B2 | 9/2012 | De La Reza et al. | |
| 2005/0059280 A1 * | 3/2005 | Hobbs et al. | 439/140 |

* cited by examiner

*Primary Examiner* — Phuong Dinh
(74) *Attorney, Agent, or Firm* — Robert J. Myers (57) ABSTRACT

An electrical distribution center assembly having a connector including a plurality of terminals and a terminal stabilizer plate engaging the tips of the terminals to hold the terminals in position and resist bending prior to inserting a mating connector into the electrical distribution center assembly. The terminal stabilizer plate is held in a ready position by a releasable latch means until an axial force applied to the releasable latch means by the mating connector body exceeds a force threshold, whereby the terminal stabilizer plate is released from the ready position and is moved to a seated position. The releasable latch means may include a flexible beam or other resilient member to hold the terminal stabilizer plate in the ready position until it is released.

19 Claims, 7 Drawing Sheets

ELECTRICAL DISTRIBUTION CENTER ASSEMBLY HAVING A TERMINAL STABILIZER PLATE

TECHNICAL FIELD OF INVENTION

The invention generally relates to electrical distribution centers, and more specifically to electrical distribution centers having at least one male terminal therewithin. Still more particularly, the present invention relates to electrical distribution centers of the aforementioned type incorporating a terminal stabilizer plate.

BACKGROUND OF INVENTION

Electrical distribution center assemblies are widely used in motor vehicles to interconnect various electrical wiring assemblies. Electrical distribution center assemblies may also be used in other non-vehicular applications. An electrical distribution center assembly can package various fuses, relays and other electrical devices in a central location. Such electrical distribution center assemblies include provisions for electrically connecting a power source and electrical devices housed in the electrical distribution center to electrical wiring harness connectors for supplying power and control signals to various electrical systems of the vehicle. Examples of electrical distribution center assemblies can be found in U.S. Pat. No. 5,715,135 granted to Brussalis et al., U.S. Pat. No. 5,788,529 granted to Borzi et al., U.S. Pat. No. 6,220,876 granted to Avila et al., U.S. Pat. No. 6,739,889 granted to Daggett et al., and U.S. Pat. No. 7,635,212 granted to Seidler.

Known electrical distribution center assemblies incorporate a connector shroud including a non-movable floor that sits at the base of the male terminals to provide some level of dimensional stabilization of the terminals prior to mating with a wiring harness connector. For additional blade stabilization and protection from damage prior to connector mating, a second piece, a terminal stabilizer plate, is mounted to the shroud to capture the terminals near the tips. The terminal stabilizer plate may be attached to the shroud with tabs defined by the terminal stabilizer plate that are inserted into slots in the shroud as shown in U.S. Pat. No. 6,422,881 granted to Puhl et al. or the terminal stabilizer plate may be integrally molded into the shroud with breakaway portions as shown in U.S. Pat. No. 8,267,702 granted to De La Raza et al. As a connector body is mated to the electrical distribution center in the vehicle, there is a momentary increase in the force needed to insert the connector body into the shroud as the tabs are pushed out of the slots or the breakaway portions are broken.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY OF THE INVENTION

In accordance with one embodiment of this invention, an electrical distribution center assembly is provided. The electrical distribution center assembly includes a housing defining an accommodation space therein and a connector shroud formed in the housing. The connector shroud has a side wall defining a shroud cavity therein for receiving a connector body. The shroud cavity communicates with the accommodation space. The electrical distribution center assembly further includes an electrical bus disposed in the accommodation space and a terminal electrically coupled to the electrical bus. The terminal projects along a terminal axis to a tip located in the shroud cavity. The electrical distribution center assembly also includes a terminal stabilizer moveable from a ready position to a seated position within the shroud cavity. The seated position is closer to the electrical bus than the ready position. The terminal stabilizer has an aperture formed therein, wherein the tip of the terminal is received in the aperture. The terminal stabilizer protects the terminal from being bent away from the terminal axis by a force applied to the terminal in a direction orthogonal to the terminal axis. The electrical distribution center assembly additionally includes a flexible beam configured to hold the terminal stabilizer in the ready position until an axial force applied to the flexible beam by the connector body exceeds a force threshold. The axial force is applied in a direction parallel to the terminal axis.

The flexible beam may be configured to release the terminal stabilizer after the axial force applied to the flexible beam by the connector body exceeds the force threshold. The terminal stabilizer may be moved from the ready position to the seated position by the connector body. The flexible beam may be integrally formed by the side wall. The flexible beam may be configured to flex in a direction perpendicular to the terminal axis when the axial force is applied to the flexible beam by the connector body. The flexible beam may define a ramp portion configured to contact the connector body and translate a portion of the axial force to a transverse force acting on the flexible beam in a direction perpendicular to the terminal axis. The flexible beam may also define a notch portion configured to engage an edge portion of the terminal stabilizer until the axial force exceeds the force threshold. The electrical distribution center assembly may further include an alignment post in which case the flexible beam may be integrally formed by the alignment post. The terminal may be characterized as a male terminal and the male terminal may be characterized as a blade shaped terminal. The terminal stabilizer plate may defines an anti-scoop feature that is configured engage the connector body and to align a mating terminal contained in the connector body to the terminal.

In another embodiment of the present invention, an electrical distribution center assembly is provided. The electrical distribution center assembly includes a generally box shaped shroud having a floor and a side wall defined substantially parallel to a central axis substantially normal to the floor. The electrical distribution center assembly further includes a plurality of elongated terminals extending up from the floor along the central axis to generally coplanar terminal tips. The terminals are subject to bending generally normal to their length when unsupported. The terminals are adapted to have a connector body inserted forcefully over the terminal tips and toward the floor along the central axis. The electrical distribution center assembly also includes a terminal stabilizer plate generally parallel to the floor and having a pattern of terminal stabilizer apertures within which the terminal tips are closely received and supported and slideable along the terminals as the terminal stabilizer plate is moved toward the floor. The electrical distribution center assembly additionally includes a releasable latch means retaining the terminal stabilizer plate in a ready position near the terminal tips before the connector body is inserted, and adapted to release the terminal stabilizer plate to move along the terminals and toward the floor when the connector body is inserted.

The plurality of elongated terminals may be electrically coupled to an electrical bus disposed proximate the floor. The electrical bus may include a circuit board. The releasable latch means may be integrally formed by the side wall. The electrical distribution center assembly may further include an alignment post, in which case the releasable latch means is integrally formed by the alignment post. The releasable latch means may include a flexible beam. The releasable latch means may include a ramp portion configured to contact the connector body when the connector body is inserted. The releasable latch means may include a notch portion configured to engage an edge portion of the terminal stabilizer until the connector body is inserted. The terminal stabilizer plate may define an anti-scoop feature that is configured engage the connector body and to align a plurality of mating terminals contained in the connector body to the plurality of terminals.

Further features and advantages of the invention will appear more clearly on a reading of the following detailed description of the preferred embodiment of the invention, that is given by way of non-limiting example only and with reference to the accompanying drawings.

BRIEF DESCRIPTION OF DRAWINGS

The present invention will now be described, by way of example with reference to the accompanying drawings, in which:

FIG. 8b is a partial top view of the connector shroud of the electrical distribution center assembly of FIG. 8a.

DETAILED DESCRIPTION OF INVENTION

An electrical distribution center assembly may be used to interconnect various wiring assemblies with a motor vehicle. The electrical distribution center includes an electrical bus and terminals connected to the bus that interface with mating terminals contained within connector bodies of the wiring assemblies. The electrical distribution center may also contain circuit protection devices, such as circuit breakers and fuses, electrical components, such as diodes, and electronic controllers. The electrical distribution center assembly includes a terminal stabilizer plate that engages at least some of the tips of the terminals on the connectors within the electrical distribution center assembly to protect the terminals from being bent before the connector body of a wiring assembly is mated to the terminals.

Figure 1:
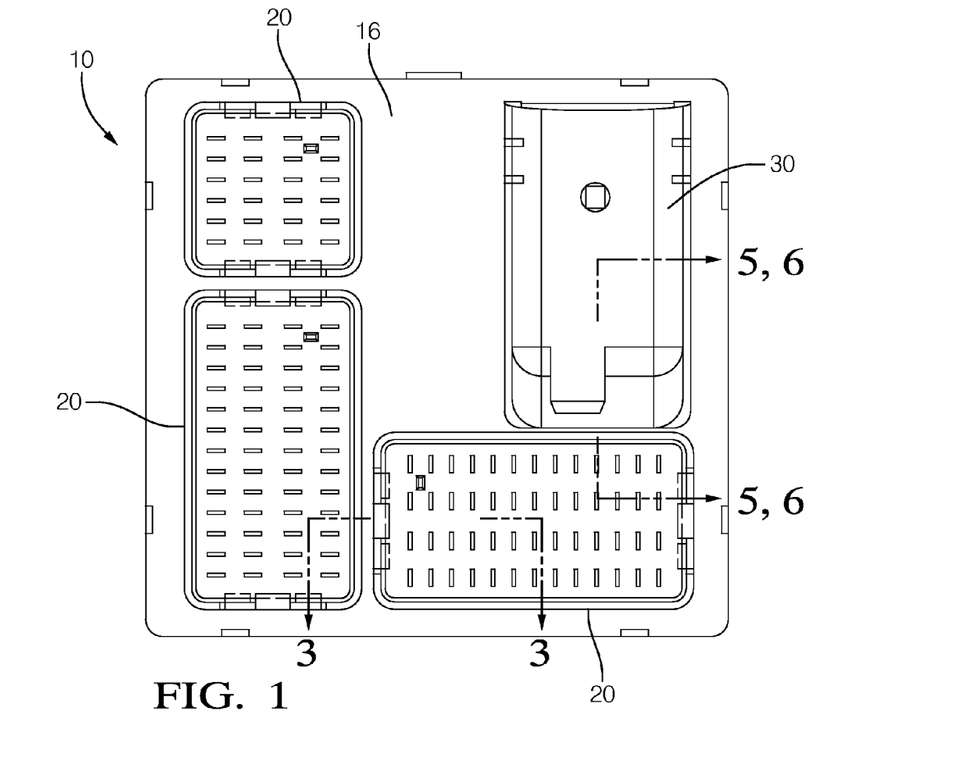
FIG. 1 is a top view of the electrical distribution center assembly in accordance with one embodiment.
Figure 2:
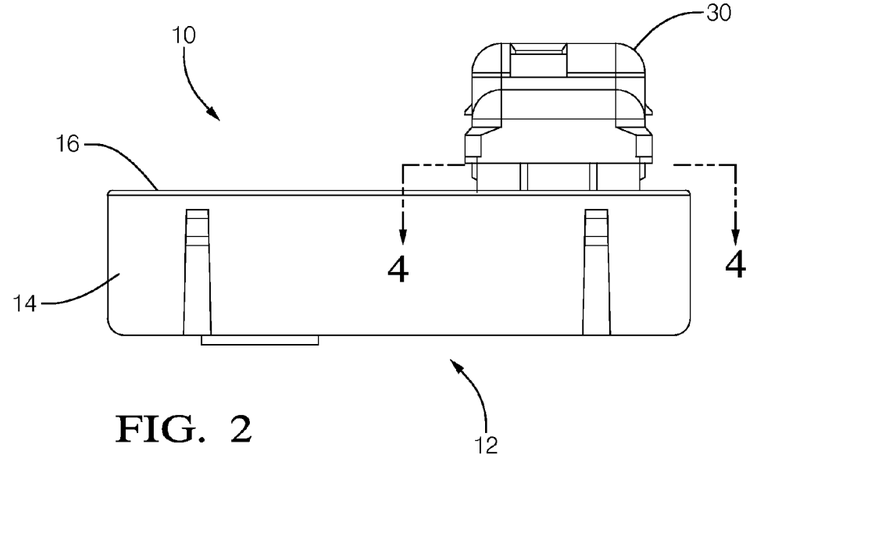
FIG. 2 is a side view of an electrical distribution center assembly of FIG. 1.

FIGS. 1 and 2 illustrate a non-limiting example of an electrical distribution center assembly 10, hereinafter the assembly 10. The assembly 10 includes a housing 12 formed of a semi-shell shaped lower housing 14 and an upper housing 16 attached to the lower housing 14. The upper housing 16 and the lower housing 14 may be formed of a dielectric material such as polypropylene (PP). The upper housing 16 and the lower housing 14 may be formed different dielectric materials and do not need to be formed of the same material.

Figure 3:
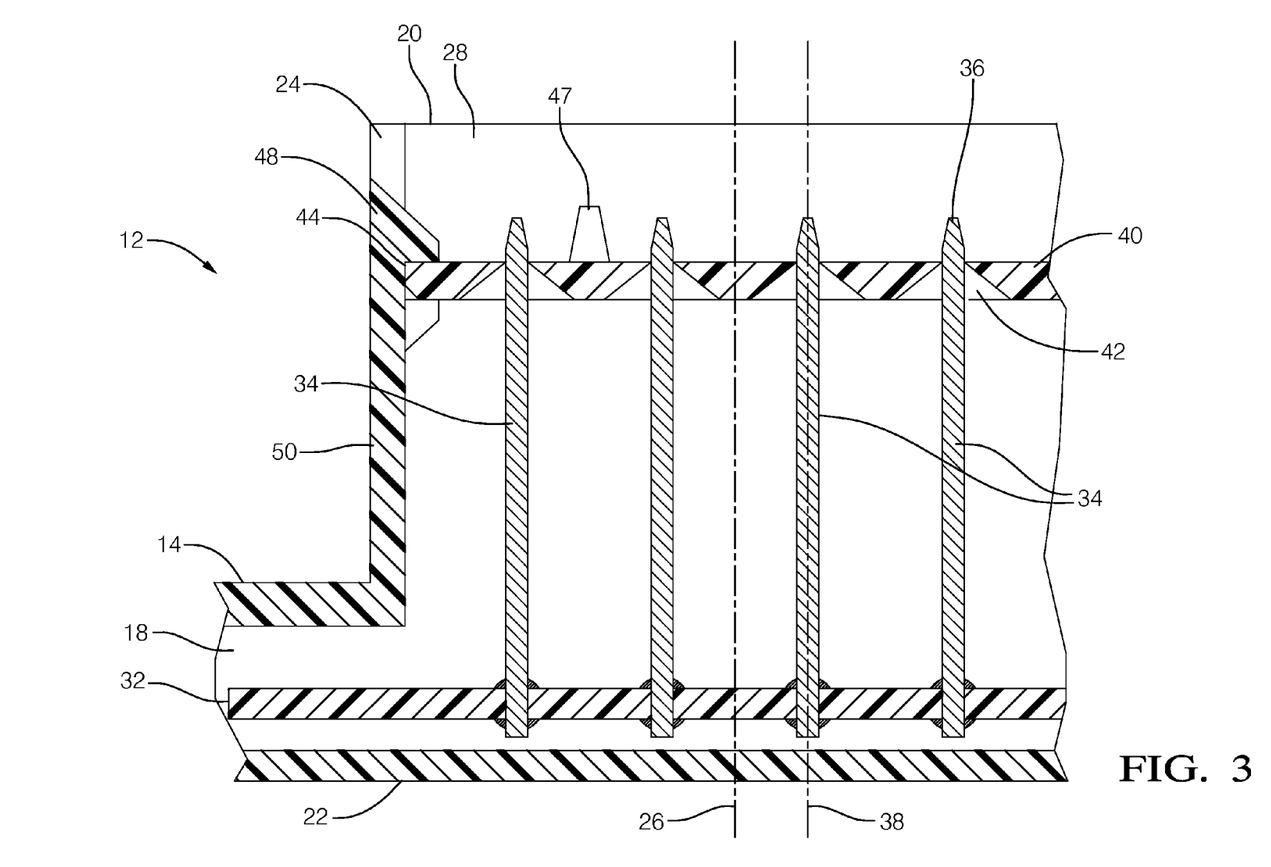
FIG. 3 is partial cut-away view of the electrical distribution center assembly of FIG. 1.
Figure 4:
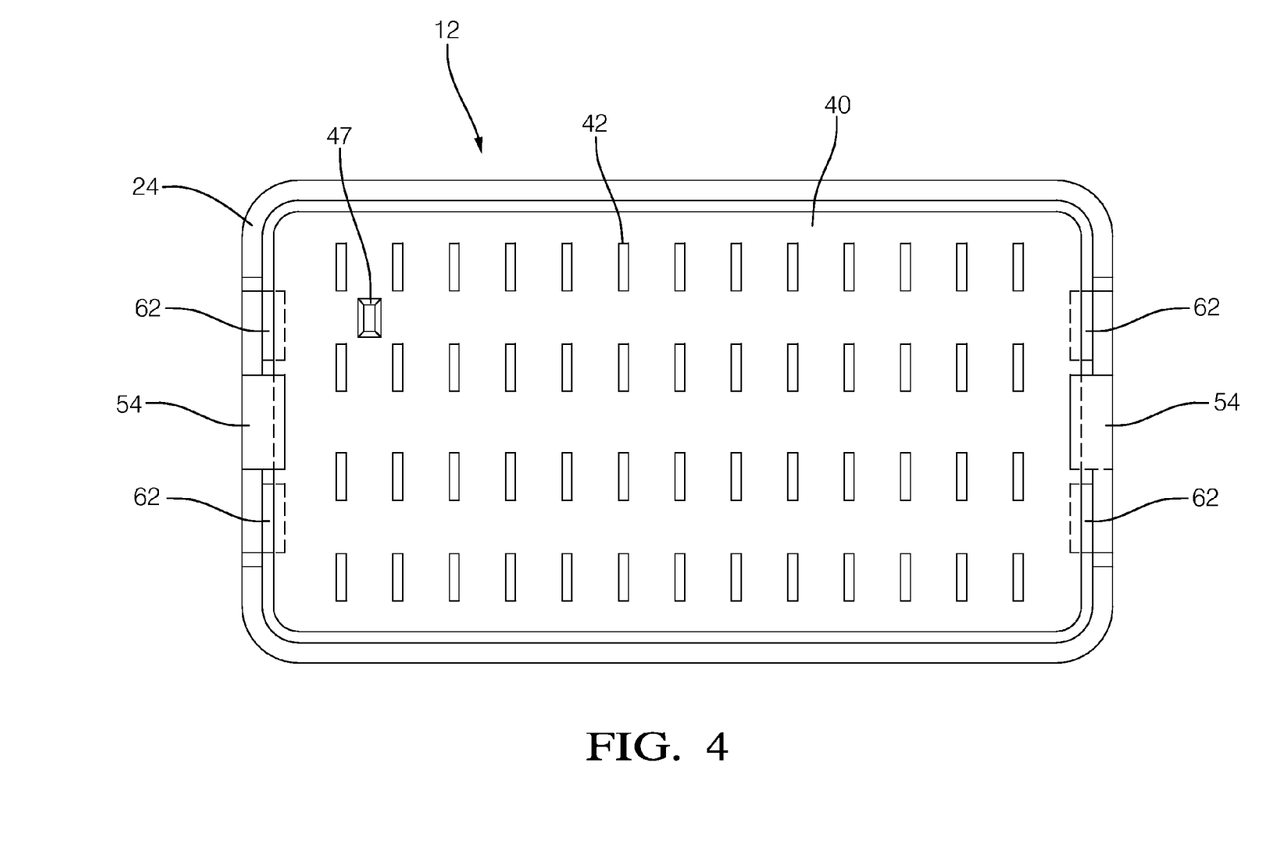
FIG. 4 is partial cut-away view of the connector shroud of the electrical distribution center assembly of FIG. 1.

As illustrated in FIG. 3, the housing 12 defines an accommodation space 18 therein. The upper housing 16 includes a connector shroud 20, hereinafter shroud 20, formed in the housing 12. The shroud 20 is generally box shaped and has a floor 22 defined by the lower housing 14 and a side wall 24 defined substantially parallel to a central axis 26 that is substantially normal to the floor 22 of the housing 12. As used herein, substantially parallel is ±5 degrees of absolutely parallel and substantially normal is ±5 degrees of absolutely normal. The side wall 24 defines a shroud cavity 28 therein for receiving a connector body 30, for example a connector body 30 of a wiring harness. The shroud cavity 28 communicates with the accommodation space 18.

An electrical bus 32 is disposed proximate the floor 22 within the accommodation space 18. The electrical bus 32 may be a printed circuit board printed circuit board (PCB) containing conductive traces (not shown) configured to connect a plurality of terminals 34 and circuit protection devices (not shown) or other electrical components (not shown). The PCB may be made from epoxy or polyimide resins. The resin may be reinforced with a woven glass cloth or other matrix such as chopped fibers. Circuit boards formed of such materials are typically called FR-4 or G-10 type circuit boards. The PCB may alternately be constructed of ceramic or rigid polymers. This listing of acceptable circuit board materials is not exhaustive and other materials may also be used successfully. The materials and manufacturing techniques used to form printed circuit boards are well known to those skilled in the art. Alternatively, another type of electrical bus, such as a routed wire plate or conductive bus bar, may be used instead of or in addition to the PCB.

The assembly 10 includes a plurality of elongated terminals 34 extending up from the electrical bus 32 near the floor 22 along the central axis 26 to generally coplanar terminal tips 36. As used herein, the generally coplanar terminal tips 36 are ±1 millimeter of being absolutely coplanar. The terminals 34 are subject to bending in a direction generally normal to their length, that is normal to the central axis 26, when the terminals 34 are unsupported near the terminal tips. The terminals 34 are adapted to have a connector body 30 inserted forcefully over the terminal tips and toward the floor 22 along the central axis 26. The plurality of terminals 34 is electrically coupled to the electrical bus 32. The terminals 34 in this example are male, blade shaped terminals having a rectangular cross section. Other terminal shapes having a round square cross section may also or alternatively be used based on the intended application of the assembly 10. Each terminal in the plurality of terminals 34 project along a terminal axis 38, that is parallel to the central axis 26, to the terminal tip 36 located in the shroud cavity 28. The terminals 34 are adapted to electrically connect to mating terminals 39 disposed within the connector body 30.

Figure 5:
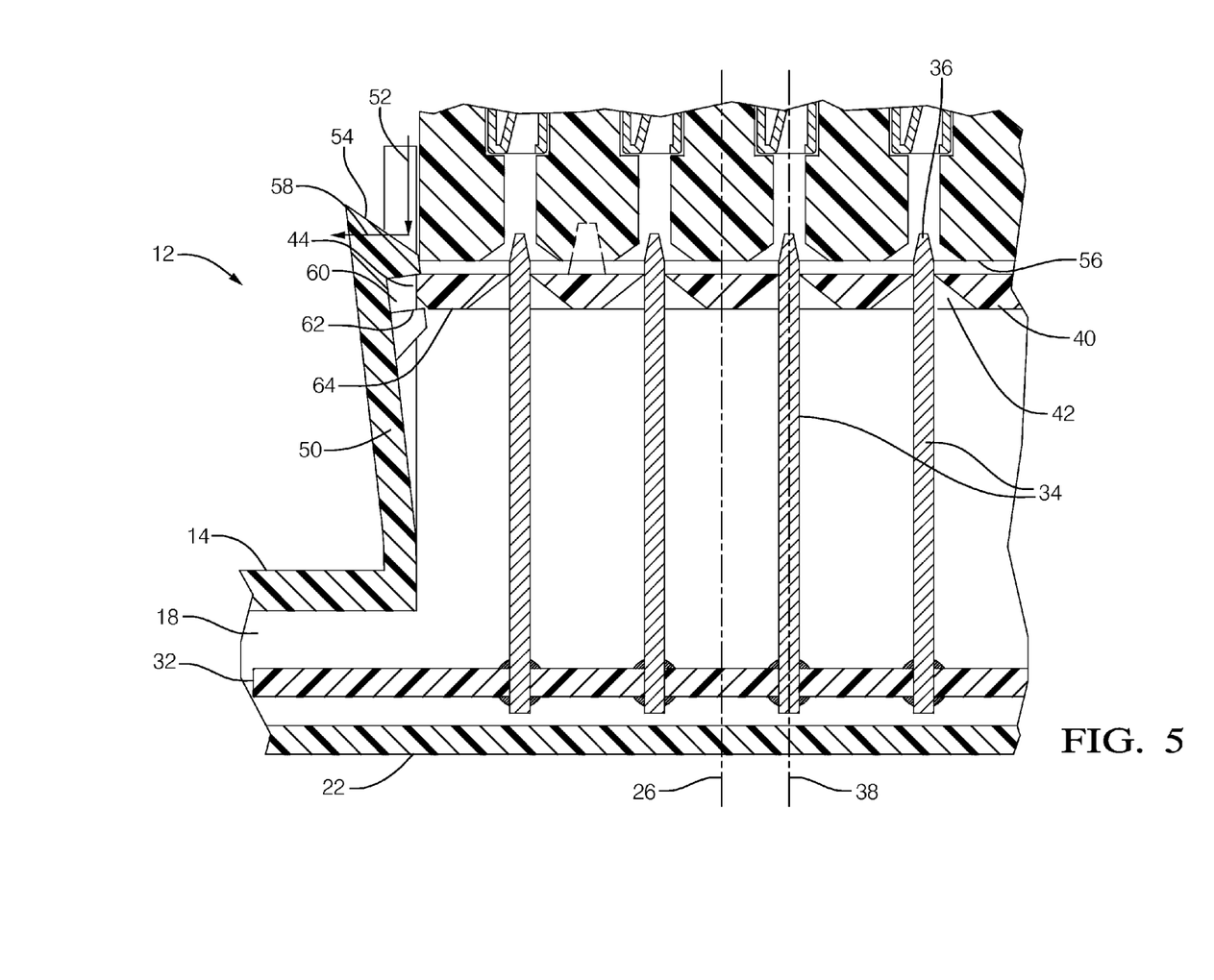
FIG. 5 is partial cut-away view of the connector body contacting the releasable latch means of the electrical distribution center assembly of FIG. 1 with the terminal stabilizer plate in the ready position.
Figure 6:
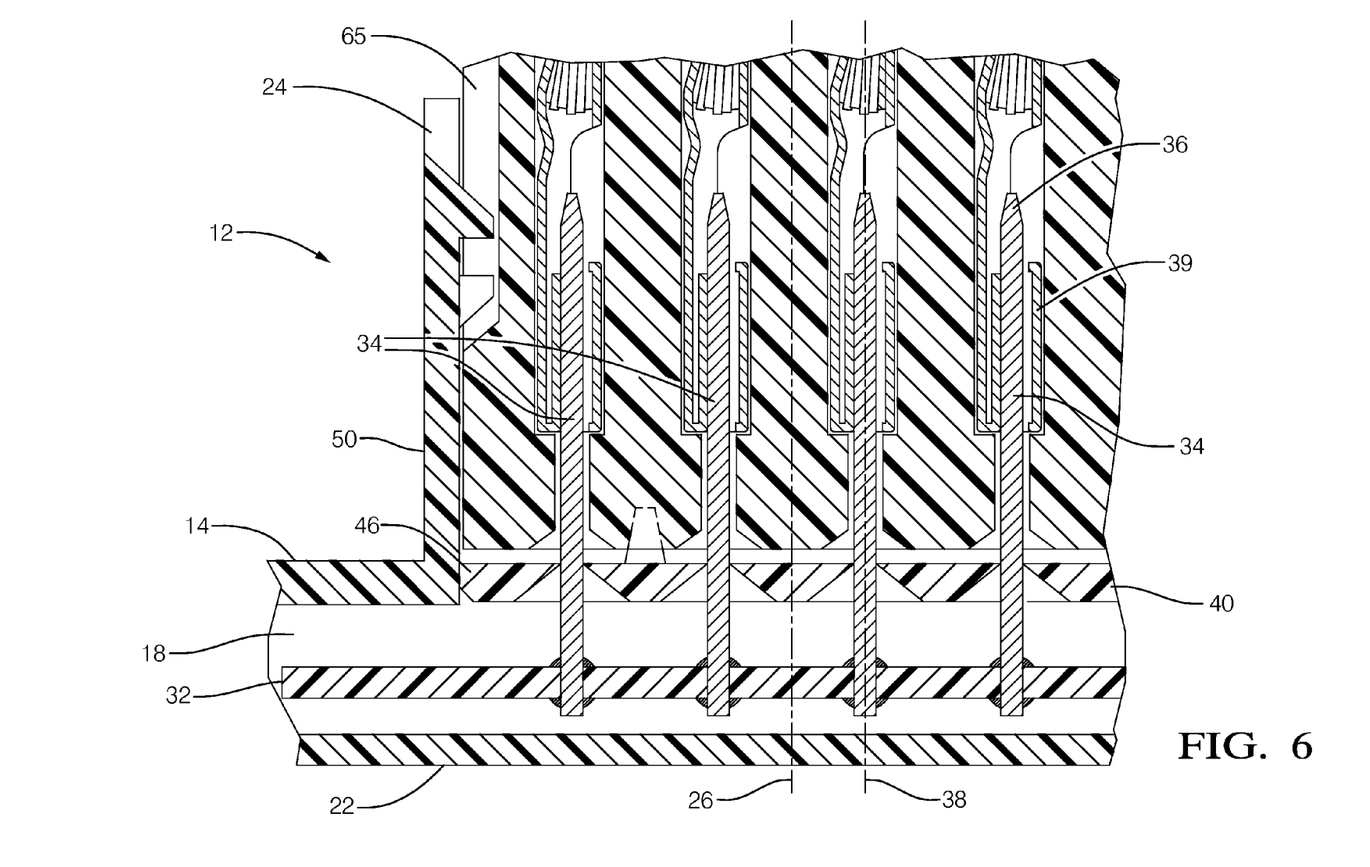
FIG. 6 is partial cut-away view of the connector body fully seated in the electrical distribution center assembly of FIG. 1 with the terminal stabilizer plate in the seated position.

The assembly 10 also includes a terminal stabilizer plate 40, hereinafter plate 40, that is generally or substantially parallel to the floor 22 and has a plurality of terminal stabilizer apertures 42, hereinafter apertures 42, formed in a pattern configured to match the terminals 34 into which the terminal tips are closely received and supported. The apertures 42 are slideable along the terminals 34 as the plate 40 is moved toward the floor 22 of the housing 12. As best illustrated in FIGS. 3 and 5, the plate 40 is moveable from a ready position 44 in which the terminal tips are supported, to a seated position 46, as best illustrated in FIG. 6, within the shroud cavity 28. The seated position 46 is closer to the electrical bus 32 and the floor 22 than the ready position 44. When in the ready position 44, the plate 40 protects the terminals 34 from being bent away from the terminal axis 38 by a force applied to the terminals 34 in a direction orthogonal to the terminal axis 38. The plate 40 may also inhibit foreign material (not shown) from entering the shroud cavity 28. The plate 40 may be formed of a dielectric material, such as glass-filled polybutylene terephthalate (PBT) known by various trade names such as CRASTIN, ULTRADUR, or VALOX. An engineered plastic such as PBT allows the plate 40 to be molded with tighter dimensional tolerances than other plastics, such as PP. The plate 40 may also include an anti-scoop feature 47 configured to prevent connection of the connector body 30 at an angle other than along the terminal axis 38 as well as align the connector body 30 to align the mating terminals 39 to the terminals 34 before the terminals 34 and mating terminals 39 engage.

The assembly 10 additionally includes a releasable latch means 48 retaining the plate 40 in the ready position 44 near the terminal tips before the connector body 30 is inserted, and adapted to release the plate 40 to move along the terminals 34 and toward the floor 22 and to the seated position 46 when the connector body 30 is inserted. In the embodiments illustrated in FIGS. 3-7, the releasable latch means 48 includes a flexible beam 50 configured to hold the plate 40 in the ready position 44. The releasable latch means 48 keeps the plate 40 in the ready position 44 until the connector body 30 contacts the releasable latch means 48 and applies an axial force 52 to the flexible beam 50 when the connector body 30 is inserted into the shroud 20. The axial force 52 is applied to the flexible beam 50 in a direction that is parallel to the central axis 26 or terminal axis 38. The releasable latch means 48 is configured to release the plate 40 after the axial force 52 applied to the flexible beam 50 by the connector body 30 exceeds a force threshold. After the releasable latch means 48 releases the plate 40, the plate 40 is moved from the ready position 44 to the seated position 46 by the connector body 30. The flexible beam 50 is configured to flex in a direction substantially perpendicular to the terminal axis 38 when the axial force 52 is applied to releasable latch means 48 by the connector body 30. As used herein, substantially perpendicular is ±5 degrees of absolutely perpendicular. The assembly 10 may include a plurality of releasable latch means 48, preferably placed on opposite side walls of the shroud 20 to provide even support of the plate 40 in the ready position 44 and configured to release the plate 40 substantially simultaneously. As used herein, substantially simultaneously means the plate is released from each of the plurality of releasable latch means 48 within 10 milliseconds of the plate 40 being released from the first releasable latch means 48. The flexible beam 50 has a thickness, width and height that along with the properties of the material used to form the flexible beam 50 will determine the force threshold required to release the plate 40.

As best illustrated in FIG. 5, the releasable latch means 48 defines a ramp portion 54 that is configured to contact the leading edge 56 of the connector body 30. As the ramp portion 54 contacts the connector body 30, the ramp portion 54 translates a portion of the axial force 52 applied by the connector body 30 to a transverse force 58 acting on the flexible beam 50 in a direction perpendicular to the terminal axis 38. The transverse force 58 flexes the flexible beam 50 in a direction perpendicular to the terminal axis 38. The angle formed between the ramp portion 54 and the central axis 26 will further determine the force threshold required to release the plate 40.

The releasable latch means 48 also defines a notch portion 60 configured to engage an edge portion of the plate 40 until the axial force 52 exceeds the force threshold. The notch portion 60 engages the edge of the plate 40 until the flexible beam 50 flexes to a point where a lower notch surface 62 is no longer engaged with a lower surface 64 of the plate 40 when the axial force 52 exceeds the force threshold.

As best illustrated in FIG. 6, after the lower notch surface 62 is disengaged from the lower surface 64 of the plate 40, the plate 40 will fall into the seated position 46 or be pushed by the connector body 30 into the seated position 46. The depth of the engagement of the lower notch surface 62 with the lower surface 64 of the plate 40 will also determine the force threshold required to release the plate 40, since the depth determines how far the flexible beam 50 must be flexed before the plate 40 is released. The connector body 30 may define a relief cavity 65 to reduce the connector body 30 insertion force needed to fully seat the connector body 30 in the shroud 20. According the example illustrated in FIGS. 3-6, the flexible beam 50 is integrally formed by the side wall 24 of the housing 12. Other embodiments may be envisioned in which the flexible beam 50 is a structure separate from the side wall.

Figure 7:
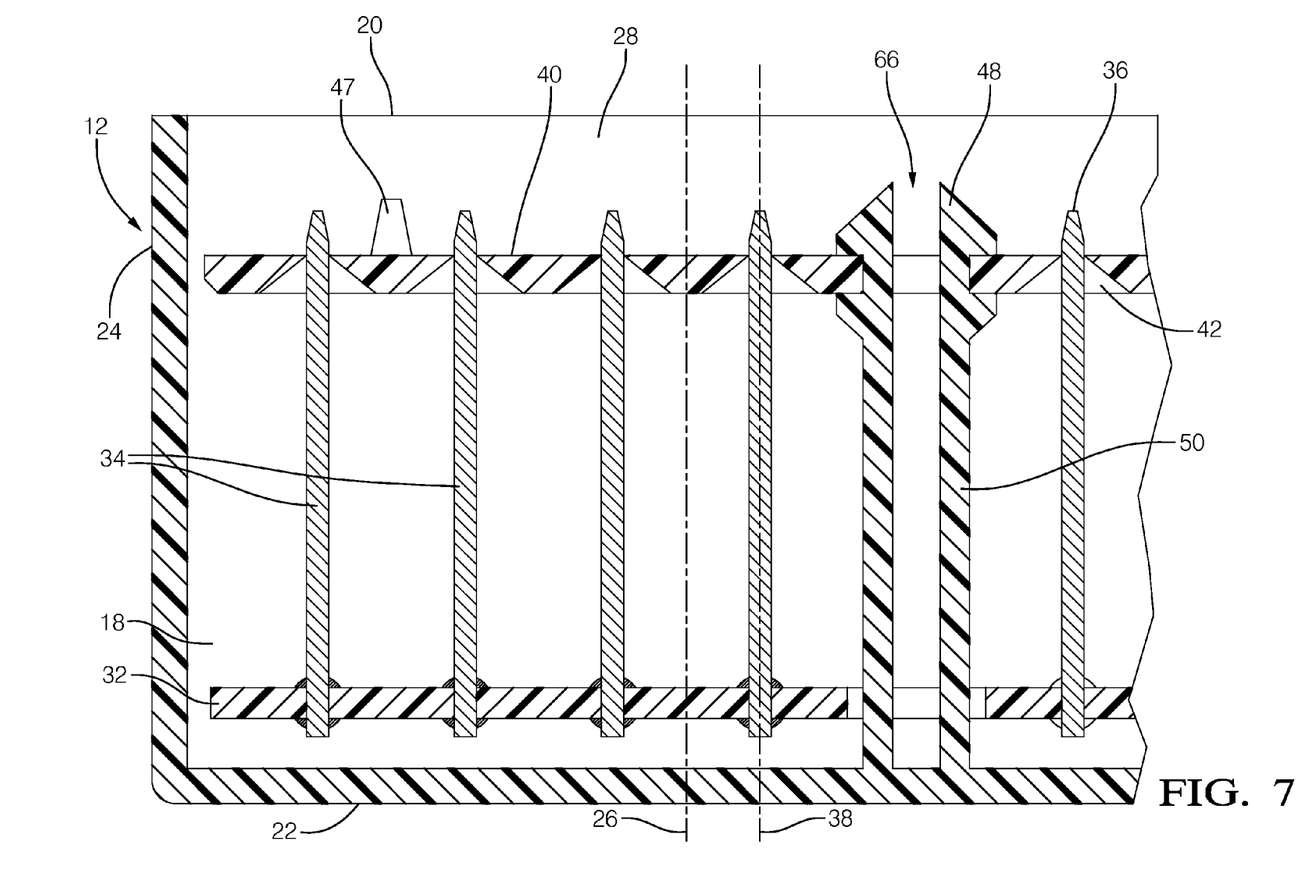
FIG. 7 is partial cut-away view of an electrical distribution center assembly in accordance with another embodiment.

FIG. 7 illustrates a non-limiting example of the assembly 10 wherein the assembly 10 includes an alignment post 66 and the releasable latch means 48 is integrally formed by the alignment post 66. The alignment post 66 is located away from the side walls in a central portion of the shroud cavity 28. The alignment post 66 is configured to interface with a mating alignment feature on the connector body 30 (not shown) that contacts the ramp portion 54 of the releasable latch means 48 and flexes the flexible beam 50 inward or in a direction toward the interior of the alignment post 66. Incorporating the releasable latch means 48 and flexible beam 50 into the alignment post 66 offers the benefit of using the plate 40 with a sealed connector body 30, since incorporating the flexible beam 50 into the side wall 24 of the shroud 20 would not allow a sealed connection between the connector body 30 and the shroud 20.

Figure 8A:
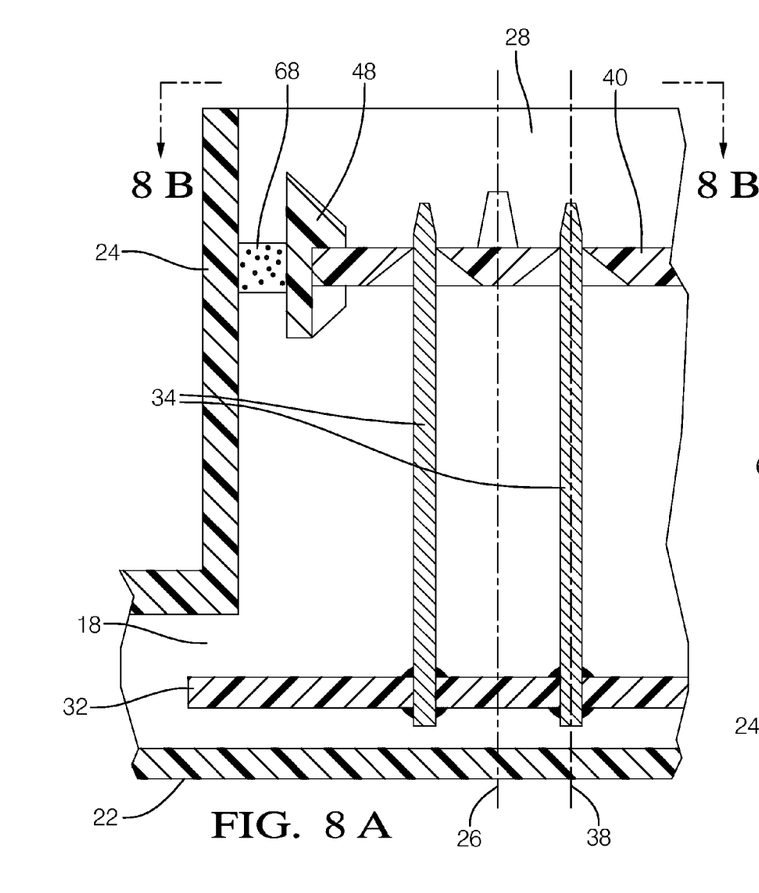
FIG. 8a is partial cut-away view of an electrical distribution center assembly in accordance with yet another embodiment.
Figure 8B:
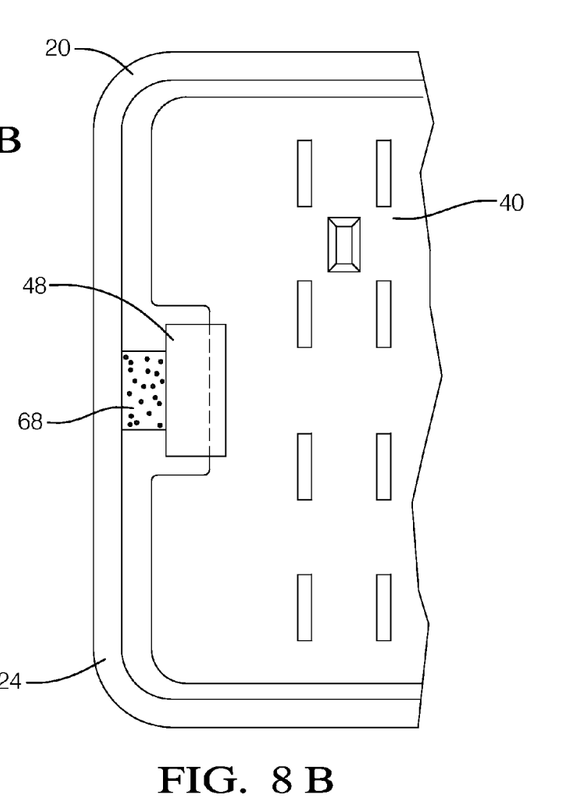

FIGS. 8a and 8b illustrate yet another embodiment of the invention wherein the releasable latch means 48 includes a resilient member 68, such as an elastomeric foam block. The resilient member may be formed of closed cell polyurethane foam, silicone rubber, a metallic compression spring, or any other suitable resilient material. The releasable latch means 48 keeps the plate 40 in the ready position 44 until the connector body 30 contacts the releasable latch means 48 and applies an axial force 52 to the releasable latch means 48 when the connector body 30 is inserted into the shroud 20. The axial force 52 is applied to the releasable latch means 48 in a direction that is parallel to the central axis 26 or terminal axis 38. The releasable latch means 48 defines a ramp portion 54 that is configured to contact the leading edge 56 of the connector body 30. As the ramp portion 54 contacts the connector body 30, the ramp portion 54 translates a portion of the axial force 52 applied by the connector body 30 to a transverse force 58 acting on the resilient member 68 in a direction perpendicular to the terminal axis 38. The transverse force 58 compresses the resilient member 68 in a direction perpendicular to the terminal axis 38. The releasable latch means 48 is configured to release the plate 40 after the axial force 52 applied to the flexible beam 50 by the connector body 30 exceeds a force threshold. After the flexible beam 50 releases the plate 40, the plate 40 is moved from the ready position 44 to the seated position 46 by the connector body 30. The assembly 10 may include a plurality of releasable latch means 48, preferably placed on opposite side walls of the shroud 20 to provide even support of the plate 40 in the ready position 44 and configured to release the plate 40 substantially simultaneously.

The releasable latch means 48 also defines a notch portion 60 configured to engage an edge portion of the plate 40 until the axial force 52 exceeds the force threshold. The notch portion 60 engages the edge of the plate 40 until the resilient member 68 compresses to a point where a lower notch surface 62 is no longer engaged with a lower surface 64 of the plate 40 when the axial force 52 exceeds the force threshold. The lower notch surface 62 does not engage the lower surface 64 of the plate 40, the plate 40 will fall into the seated position 46 or be pushed by the connector body 30 into the seated position 46. The depth of the engagement of the lower notch surface 62 with the lower surface 64 of the plate 40 will also determine the force threshold required to release the plate 40, since the depth determines how far the flexible beam 50 must be flexed before the plate 40 is released. The connector body 30 may define a relief cavity 65 to reduce the connector body 30 insertion force needed to fully seat the connector body 30 in the shroud 20.

The stiffness of the resilient member 68 will determine the force threshold required to release the plate 40. The angle formed between the ramp portion 54 and the central axis 26 will further determine the force threshold required to release the plate 40.

Accordingly, an electrical distribution center assembly 10 is provided. The assembly 10 includes a terminal stabilizer plate 40 that engages the tip of a plurality of terminals 34 and protects the terminals 34 from being bent while the plate 40 is in the ready position 44. The plate 40 is held in the ready position 44 by a releasable latch means until an axial force 52 applied to the releasable latch means by a connector body 30 inserted into the assembly 10 exceeds a force threshold and the plate 40 is released and allowed to move to a seated position 46. The force threshold is be determined by the characteristics of the releasable latch means 48 such as flexible beam 50 dimensions, flexible beam 50 or resilient member 68 material, or angle of the ramp portion 54. These characteristics can be tailored to the force threshold requirements for the specific application of the assembly 10. Additionally, in contrast to the terminal stabilizer plates shown by Puhl et al. and De La Raza et al, the axial force 52 needed to mate the connector body 30 in the shroud 20 increases more gradually as the connector body contacts the ramp portion of the releasable latch means 48 and flexes the flexible beam 50 flexes or compresses the resilient member 68 rather than the axial force 52 suddenly increasing when the connector body contacts the plate as in the terminal stabilizer plates shown by Puhl et al. and De La Raza et al. This may allow the maximum connector insertion force of the assembly 10 required to mate the connector body 30 to the shroud 20 to be lower than prior art terminal stabilizer plates.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:
1. An electrical distribution center assembly comprising:
a housing formed of a plastic material and defining an accommodation space therein;
a connector shroud formed by said housing, the connector shroud having a side wall defining a shroud cavity therein for receiving a connector body, the shroud cavity communicating with the accommodation space;
an electrical bus disposed in the accommodation space;
a terminal electrically coupled to said electrical bus, said terminal projecting along a terminal axis to a tip located in the shroud cavity;
a terminal stabilizer plate moveable from a ready position to a seated position within the shroud cavity, wherein the seated position is closer to said electrical bus than the ready position, the terminal stabilizer plate having an aperture formed therein, wherein the tip of the terminal is received in the aperture, whereby the terminal stabilizer plate protects the terminal from being bent away from the terminal axis by a force applied to the terminal in a direction orthogonal to the terminal axis; and
a flexible beam integrally formed with the housing of the same plastic material and configured to hold said terminal stabilizer plate in the ready position until an axial force applied to the flexible beam by the connector body exceeds a force threshold, wherein the axial force is applied in a direction parallel to the terminal axis.

2. The electrical distribution center assembly in accordance with claim 1, wherein said flexible beam is configured to release said terminal stabilizer plate after the axial force applied to the flexible beam by the connector body exceeds the force threshold.

3. The electrical distribution center assembly in accordance with claim 2, wherein said terminal stabilizer plate is moved from the ready position to the seated position by the connector body.

4. The electrical distribution center assembly in accordance with claim 1, wherein said flexible beam is formed by the side wall.

5. The electrical distribution center assembly in accordance with claim 1, wherein said flexible beam is configured to flex in a direction perpendicular to the terminal axis when the axial force is applied to the flexible beam by the connector body.

6. The electrical distribution center assembly in accordance with claim 5, wherein said flexible beam defines a ramp portion configured to contact the connector body and translate a portion of the axial force to a transverse force acting on the flexible beam in a direction perpendicular to the terminal axis.

7. The electrical distribution center assembly in accordance with claim 1, wherein said flexible beam defines a notch portion configured to engage an edge portion of the terminal stabilizer plate until the axial force exceeds the force threshold.

8. The electrical distribution center assembly in accordance with claim 1, wherein the housing further includes an alignment post separated from the side wall and integrally formed within the housing of the same plastic material, wherein said flexible beam is integrally formed by the alignment post.

9. The electrical distribution center assembly in accordance with claim 1, wherein said terminal is characterized as a male terminal.

10. The electrical distribution center assembly in accordance with claim 1, wherein the terminal stabilizer plate defines an anti-scoop feature configured engage the connector body and to align a mating terminal to the terminal.

11. An electrical distribution center assembly comprising:
a generally box shaped shroud formed of a plastic material and having a floor and a side wall defined substantially parallel to a central axis substantially normal to said floor;
a plurality of elongated terminals extending up from said floor along said central axis to generally coplanar terminal tips, said terminals being subject to bending generally normal to their length when unsupported, said terminals adapted to have a connector body inserted forcefully over said terminal tips and toward said floor along said central axis;
a terminal stabilizer plate generally parallel to said floor and having a pattern of terminal stabilizer apertures within which said terminal tips are closely received and supported and slideable along said terminals as said terminal stabilizer plate is moved toward said floor; and
a releasable latch means integrally formed with the shroud of the same plastic material and retaining said terminal stabilizer plate in a ready position near said terminal tips before said connector body is inserted, said releasable latch means adapted to release said terminal stabilizer plate to move along said terminals and toward said floor when said connector body is inserted.

12. The electrical distribution center assembly in accordance with claim 11, wherein said plurality of elongated terminals is electrically coupled to an electrical bus disposed proximate said floor.

13. The electrical distribution center assembly in accordance with claim 12, wherein said electrical bus includes a circuit board.

14. The electrical distribution center assembly in accordance with claim 11, wherein said releasable latch means is formed by the side wall.

15. The electrical distribution center assembly in accordance with claim 11, wherein the shroud further includes an alignment post separated from the side wall and integrally formed within the shroud of the same plastic material, wherein said releasable latch means is integrally formed by the alignment post.

16. The electrical distribution center assembly in accordance with claim 11, wherein said releasable latch means includes a flexible beam.

17. The electrical distribution center assembly in accordance with claim 11, wherein said releasable latch means includes a ramp portion configured to contact the connector body when said connector body is inserted.

18. The electrical distribution center assembly in accordance with claim 11, wherein said releasable latch means includes a notch portion configured to engage an edge portion of the terminal stabilizer plate until the connector body is inserted.

19. The electrical distribution center assembly in accordance with claim 11, wherein the terminal stabilizer plate defines an anti-scoop feature configured engage the connector body and to align a plurality of mating terminals to the plurality of terminals.

* * * * *